Feb. 5, 1957 F. LJUNGSTRÖM 2,780,450
METHOD OF RECOVERING OIL AND GASES FROM NON-CONSOLIDATED
BITUMINOUS GEOLOGICAL FORMATIONS BY HEATING
TREATMENT IN SITU
Filed May 20, 1952 4 Sheets-Sheet 1

Feb. 5, 1957 F. LJUNGSTRÖM 2,780,450
METHOD OF RECOVERING OIL AND GASES FROM NON-CONSOLIDATED
BITUMINOUS GEOLOGICAL FORMATIONS BY HEATING
TREATMENT IN SITU
Filed May 20, 1952 4 Sheets-Sheet 2
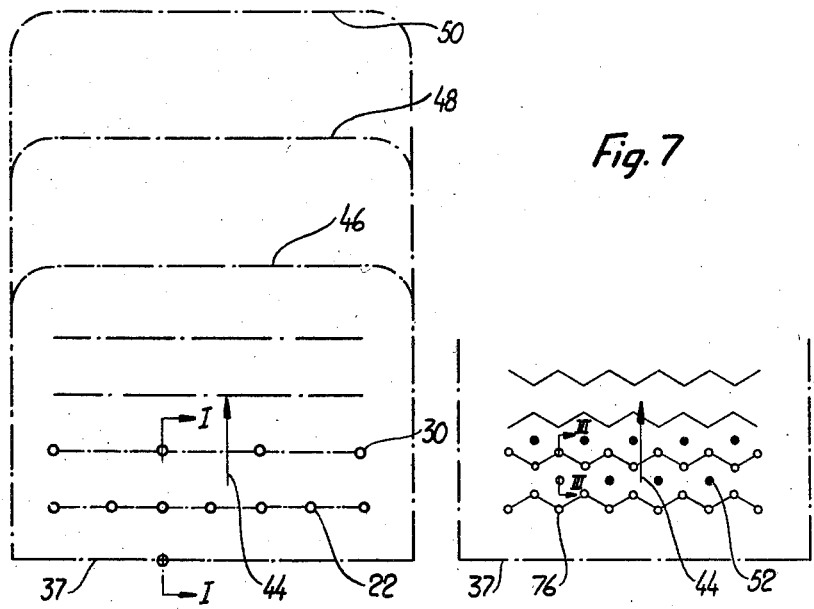
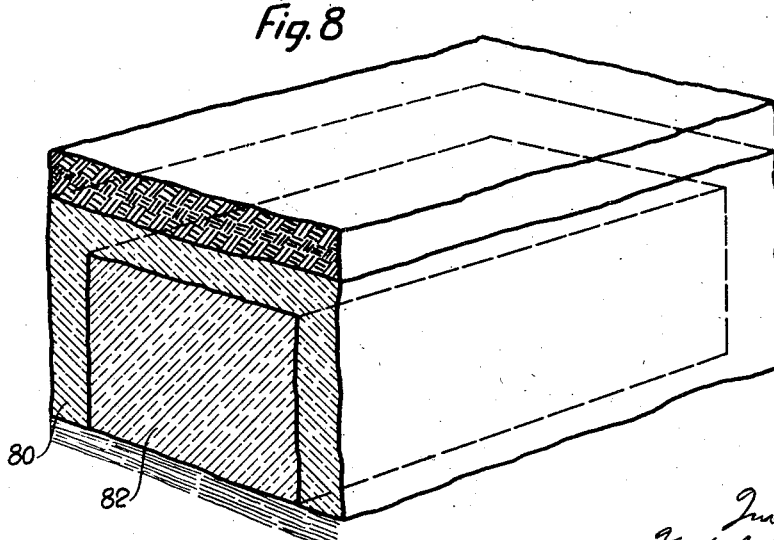

Feb. 5, 1957  F. LJUNGSTRÖM  2,780,450
METHOD OF RECOVERING OIL AND GASES FROM NON-CONSOLIDATED
BITUMINOUS GEOLOGICAL FORMATIONS BY HEATING
TREATMENT IN SITU
Filed May 20, 1952  4 Sheets-Sheet 4
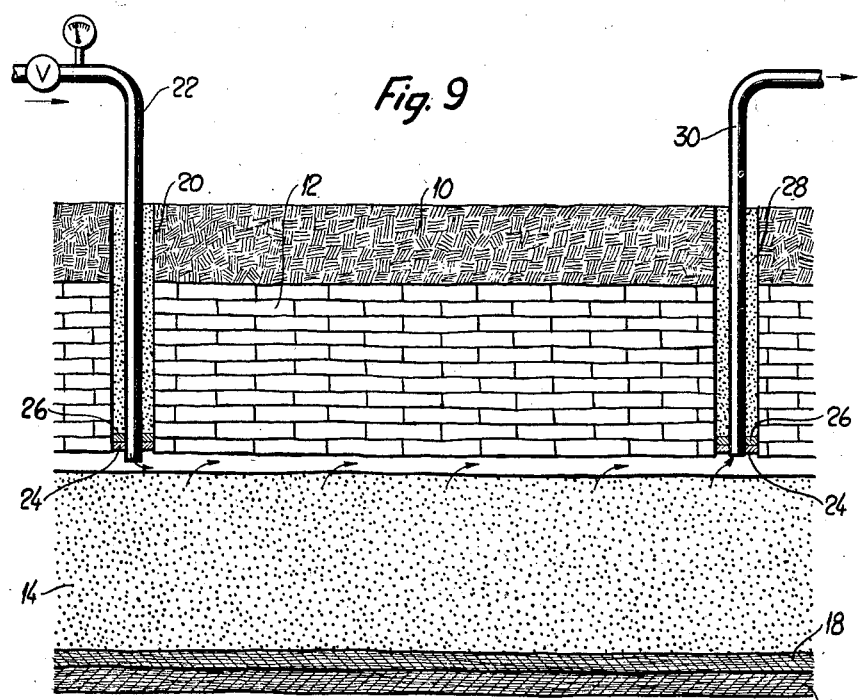
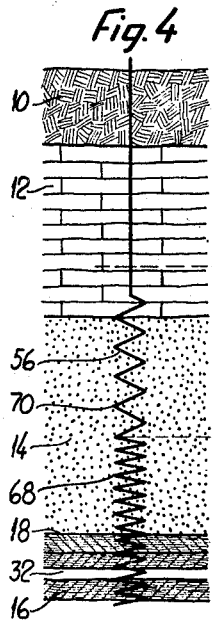
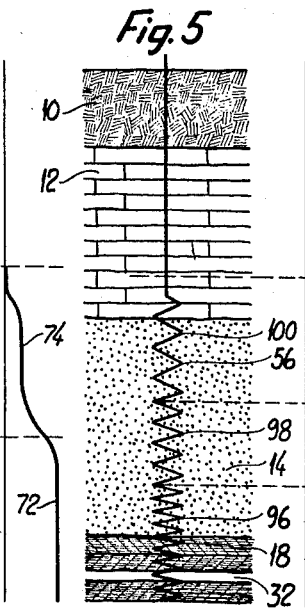
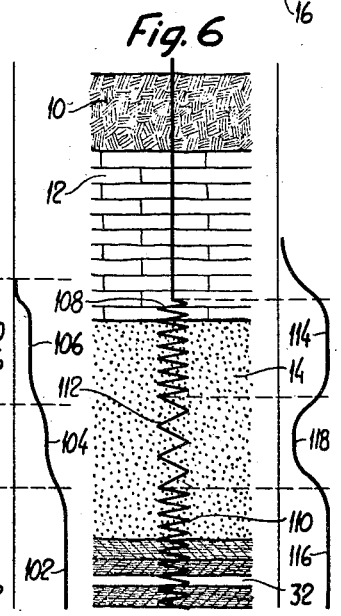

United States Patent Office 2,780,450
Patented Feb. 5, 1957

2,780,450

METHOD OF RECOVERING OIL AND GASES FROM NON-CONSOLIDATED BITUMINOUS GEOLOGICAL FORMATIONS BY A HEATING TREATMENT IN SITU

Fredrik Ljungström, Fiskebackskil, Sweden, assignor to Svenska Skifferolje Aktiebolaget, Orebro, Sweden, a joint-stock company of Sweden Application May 20, 1952, Serial No. 288,946

Claims priority, application Sweden March 7, 1952

5 Claims. (Cl. 262—3)

My present invention relates to a method of extracting oils and gases from bituminous, non-consolidated geological formations, i. e. formations wherein no solid coherence of the individual particles of the formation exists. An example of such bituminous geological formation is the tar sand which exists in enormous quantities in Athabasca in Northern Alberta, Canada. The bituminous substance present between the individual sand grains is semisolid or thickly liquid and of a tar-like consistency. Usually every sand grain is surrounded by a thin layer of water about which the tar forms a cover encasing the water. Because of the semisolid character of the oil any recovery thereof in an economic way proved hitherto impracticable. For example, experiments were made with extraction by means of solvents or washing with hot water, but the structure of the material characterized by its viscosity made it impossible to work through the mass of material.

The main object of my invention is to provide a method rendering possible on a commercial scale by heating "in situ" i. e. with the oil carrying layers undisturbed in the ground, to convert or crack the thickly liquid tarlike substance into valuable oils and gases.

Further objects and advantages of my invention will be apparent from the following description considered in connection with the accompanying drawings, which form part of the specification and of which:

Figs. 4 to 6 show electrical heating elements introduced into the strata and scales of temperature realized according to three different alternatives.

Fig. 7 is a plan view of an area which is the object of a pyrolysis performed with the heating elements illustrated in Fig. 3; the last-mentioned figure being a section on a larger scale along line III—III of Fig. 7.

Fig. 8 is a perspective view of a part of a geological body forming the object of a pyrolysis performed according to the invention.

Figure 1:
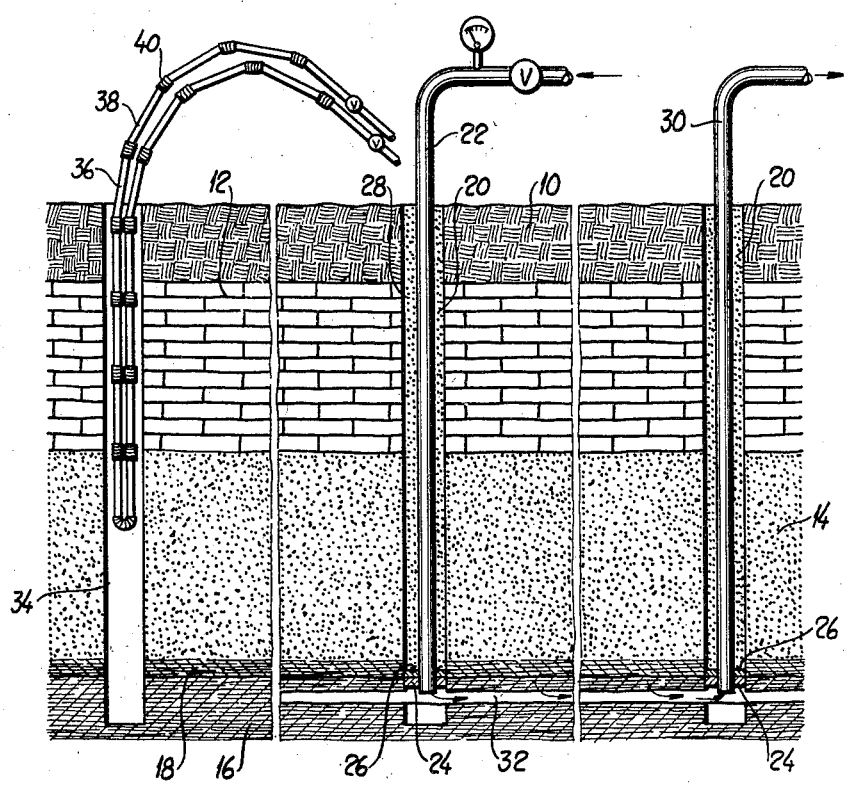
Fig. 1 is a vertical section through several strata comprising a layer of tar sand and entered by members for carrying out the method according to the invention; said figure being a section on a larger scale along line I—I of Fig. 2 representing a plan view of the area in question.

Fig. 9 finally is a vertical section through various strata in the bituminous layer of which a recovery of oil and gas is performed according to a further embodiment of the invention.

Referring to the drawings, 10 designates an overlay of earth and gravel sand resting in the case illustrated on a layer 12 of non-fuel-carrying mineral such as limestone. This layer in turn rests on a layer 14 of the bituminous non-consolidated geological formation such as tar sand which is to be subjected to pyrolysis. Below said layer is a stratum 16 having a consolidated shale-like structure consisting of superposed and possibly somewhat fuel-carrying layers having their main extent in the horizontal plane. At the transition between the two strata 14 and 16 a thinner layer 18 consisting of eroded or dismembered, for example sand-carrying clay slate, may exist. The various geological formations comprised in the crust may be of any other composition, for instance so as to contain the tar sand deposit extending up to the surface or only being overlaid by a layer of sand or gravel.

According to the invention holes or wells 20 are driven down to penetrate the stratum 16 located below the tar sand 14. Into said holes tubes 22 are introduced, said tubes at their ends entering the stratum 16 being provided with flanges 24 fitting to the wall of the hole. Above said flanges a packing or sealing material 26 may be provided and the clearance above said material between the tube and the wall of the hole is further tightened by being filled with a granular material 28 such as quartz sand. A row of such tubes 22 is indicated in Fig. 2 by a dot and dash line. In spaced relation to said line, tubes 30 are introduced and sealed in the same manner. If a combustion-supporting medium such as oxygen or air, is supplied to the tubes under a pressure surpassing the load of the formations above the stratum 16, this latter will be split up so as to lift the overlaying formations and to form a substantial horizontal space or fissure 32 extending to the tubes 30. Experiments have established that a space of this kind in alum shale, for example, will extend to a considerable distance from the place of supply of the medium, for example 50 to 100 metres and more therefrom. Combustion is started in the deposit 14 in some manner, for example, by electrical elements the structure of which is described below. An ignition of the fuel-carrying deposit may also be effected by means of solely the oxygen or the like medium introduced into the tubes 22 for example by suddenly increasing the pressure and thereby to provoke production of heat. A transport of the combustion gases is performed through the space 32 from the supply tubes 22 to the exhaust tubes 30. The layer 16 offers in itself a communication for gases and oil in the boundary zone between the same and the oil-sand layer 14 or it may be brought into such state provided that it contains organic substance which is burned. The tar sand is in its natural state difficultly permeable for flow of gases but becomes porous by having the thickly liquid tar-like bituminous substance converted into thin liquid oil and gases. A method of this kind is described for example in the U. S. co-pending patent application Serial No. 210,682, filed February 13, 1951 now forfeited which is referred to for a more detailed explanation thereof. The gasification is maintained by a suitably regulated supply of oxygen and combustion of organic substance resulting thereof and being subsequent to the pyrolysis. In proportion to the transfer of heat from below upwards into the layer of tar sand, the paste practically gas-tight represented by said sand will reach the temperature of pyrolysis (between 300 and 400° C.) and under evolution of gas become converted into a porous and gas-permeable mass in which the gas will be conducted in the direction toward the gas exhaust tubes. When a porous body has been created between the supply and the exhaust tubes, the pressure applied initially may be reduced subsequently.

Due to the fact that the exhaust tubes 30 penetrate to the porous underlying stratum 16, a kind of screen is shaped around the lower opening of each tube preventing the tar sand from penetrating into the tubes and obstructing them. This screen or filter extending over a larger horizontal area above which the tar sand is located, affords an easy outlet to the gases generated in the tar sand. Corresponding conditions exist around the supply tubes 22.

If the stratum 16 or the transition layer 18 in itself is porous in the horizontal direction, it is not necessary to produce in the tubes 22 and 30, respectively, a superatmospheric pressure of such magnitude as to lift the overlaying geological formations. According to the invention it is essential only that passages adapted to collect the recovered gases are shaped in the boundary zone of the compact tar sand or in a layer adjacent the tar sand from which passages the pyrolysis then is caused successively to advance upwards into the bituminous deposit.

In case that the geological formation resting on and covering the tar sand is not in itself impermeable to gas, the tar sand may be heated from below in an upward direction and the upper portion of the tar sand will constitute a roof preventing the gases produced by the pyrolysis from escaping upwards. In this case the process can thus be performed as long as a layer of tar sand is preserved at the top of the deposit sufficient to ensure sealing it in the upward direction.

It occurs often that the geological formations are aquiferous, which permits water to penetrate into the zone of pyrolysis thereby increasing the heat loss normally incurred in the recovery of the fuel-content of the bituminous deposit. On the other hand the economy of the heating process is impaired by combustion gases being capable of escaping in another direction than to the exhaust or collecting tubes. In order to avoid losses of said kind the area of pyrolysis may be on one side or several sides be encased by a barrier made gas-tight by being cooled down below the freezing point of water. For this purpose, the geological formations are penetrated by holes 34 into which are inserted cooling elements 36. Fig. 1 shows such an element under insertion into the holes. The holes 34 are located so as to encircle the area of pyrolysis and are thus arranged in one or several rows indicated by the dot and dash lines 37 presented in Fig. 2. The cooling elements 36 may be shaped in the form of a loop preferably flexible for facilitating their insertion into the holes. According to the embodiment illustrated in Fig. 1 the cooling element is composed of tubular pieces 38 interconnected by flexible sleeves 40 made of rubber or similar material. The cooling elements shape thus a kind of box or casing around the pyrolysis area consisting of frozen strata material and ice preventing on the one side water from entering the area from the surroundings and on the other hand gas and oil from escaping from said area. The frozen barrier is located in such spaced relation to the area of pyrolysis as not to leave to the heat sufficient time to advance to the barrier before the exploitation of the area is completed. The barrier should preferably be placed at such a distance from the area that the lifting of the overburden will not advance to it. The cooling elements will get a good heat transfer contact with the surroundings by the feature that the holes 34 are filled with subsoil water which initially is frozen to ice. Upon having fulfilled their purpose the cooling elements may be removed from the holes by melting said ice, for example, by introducing a heated medium through the tubes, said medium otherwise being identical with the cooling medium, or by means of electricity. Preferably the pyrolysis of the bituminous geological deposit is performed so as to cause a front of heat to travel in the direction of the arrow 44 in Fig. 2, fresh groups of tubes 22 and 30, respectively, being put into operation in succession to one another. The exhaust tubes 30 may in this embodiment be used as supply tubes for the medium supporting the combustion after that the area in arrear of them has been exploited. The frozen tight barrier may enclose a larger area or sealing frozen barriers 46, 48, and 50, respectively, may be produced in succession ahead of the travelling heat front. When the heat front has reached the barrier 46 the subsequent barrier 48 takes over the function of enclosing the pyrolysis area ahead of the front of heat.

A sealing freezing barrier of the kind described is more particularly shown and described in the U. S. patent application No. 288,945 filed on even date which is referred to for elucidating the details thereof.

Figure 3:
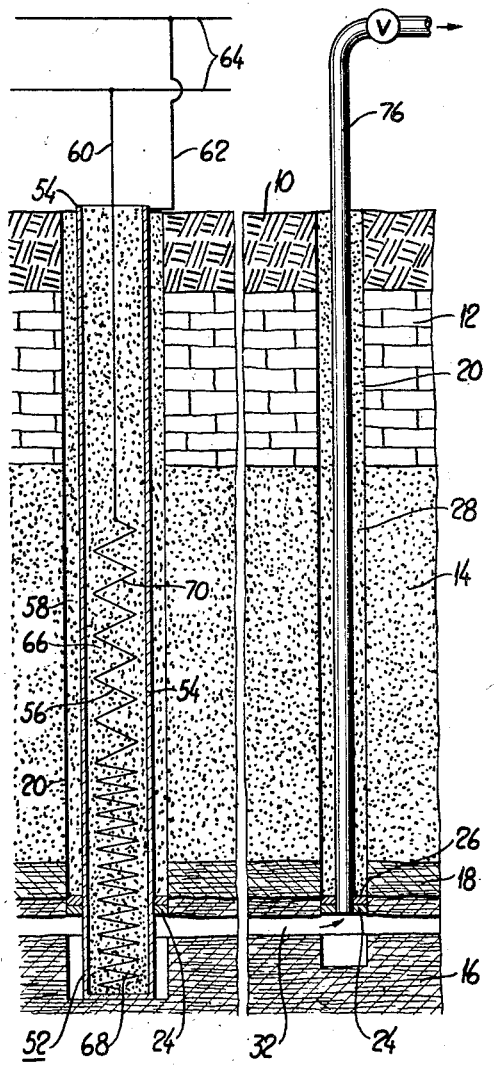
Fig. 3 is a similar section as that shown in Fig. 1 but presenting a modification of the method according to the invention.

In the embodiment presented in the Figs. 3, 4 and 7 the bituminous deposit is heated in an electrothermal way as disclosed in the U. S. patent specification Serial No. 756,624 filed June 24, 1947, now Patent No. 2,732,915 which specification is referred to for explanation of the details of the method in question and the means required for carrying out the same. The geological formations are penetrated by holes 20 entering the stratum 16 existing below the deposit 14 of tar sand. Into the holes are introduced electrically operated heating elements generally designated by 52 and consisting of tubes 54 made of metal in which one or several electrical resistances 56 are located. The clearance between the wall of the hole and the tube 54 may be filled with a heat transfer supporting granular material 58 such as quartz sand, for example. The resistance 56 is at its lower end in conductive contact with the tube 54 and by means of wires 60, 62 connected to a circuit 64 for low voltage alternating current. The clearance between the resistance 56 and the tube 54 is filled with quartz sand or similar material in order to prevent the electric current from flashing over and in addition to facilitate the transfer of the generated heat to the tar sand. The resistance can be given varying heat capacity by being shaped helically with varying pitch, in the case illustrated so that the pitch in the lower part 68 is less than that in the upper part 70. The electrical heating element 52 heats the layer of tar sand in accordance with the diagram of temperature presented in Fig. 4, the lower part thereof at first reaching the temperature of pyrolysis according to the curve branch 72, while the sand overlaying said part is heated more slowly according to the curve branch 74.

According to Fig. 5 the electrical resistance 56 is shaped with a lower part 96 having a close pitch, an intermediate part 98 having a more spaced pitch and an upper part 100 with a still greater pitch between the turns. Consequently, the bituminous deposit 14 will be heated in accordance with the curve in such manner that the lower part of the deposit at first will reach the temperature of pyrolysis according to the curve branch 102, whereas the parts above said part will be heated more slowly in accordance with the curve branches 104 and 106, respectively. It may also be suitable to shape the resistance, as indicated in Fig. 6, with upper and lower parts 108 and 110, respectively, permitting a more intensive generation of heat than is generated in the intermediate part 112. In this way the temperature curve is given two branches 114 and 116, respectively, separated from one another by a zone 118 having a lower temperature.

The geological layers are according to Fig. 3 penetrated by holes or wells 20 extending below the layer of tar sand into the layer 16 and entered by tubes 76 which by means of flanges 24 and packings 26 and packed sand 28 are tightened against the wall of the hole or well. The lower end of the holes or wells is in this case located in the layer 16 which may be of the stratified kind described above.

The lower part of the layer of tar sand reaching the temperature of pyrolysis (of 300 to 400° C.), gases are generated which are accumulated to exert such pressure as to lift the layer of sand and to create a substantial horizontal space or fissure 32 in the stratified layer 16. The gases will thus force a passage to the escape tubes 76. In this connection it is advantageous to place heating elements 52 in groups around the escape tubes 76 as indicated in Fig. 7. By the pyrolysis the tar sand becomes porous and thus permeable to the flow of gas.

Referring to Fig. 8, 80 designates a tight box or case of the fuel-carrying deposit and adjacent geological strata in which a body 82 is the object of the gasification. In this case the heated body is both at the top and laterally bounded by the non-consolidated geological formation. This method, which also is applicable to the preceding embodiments of the invention, makes it possible to create a gastight barrier composed of the tar sand proper, in the event it is not covered by a gas-impermeable geological formation.

If the layer of sand 14 is covered by a consolidated geological layer difficultly permeable to the flow of gas generated by the pyrolysis either because of its kind or by a freezing operation of the kind described above, the lifting of the overburden may be performed at the top or above the layer of sand, as is shown in Fig. 9. In this case, holes 20 are drilled down into the layer of sand and supply tubes 22 for oxygen or air and collecting tubes 30 are introduced into said holes, as is shown in Fig. 9. The pyrolysis of the layer of sand is thus commenced at the top of the layer of sand and is then caused to progress in a downward direction. It is also possible to combine this embodiment with the preceding ones so as to start the extraction of the fuel content of the tar sand from both the top and the bottom, in which case heating elements of the kind illustrated in Fig. 6 preferably are employed. If the geological formation adjacent the top of the sand layer is porous in the horizontal plane, any lifting of ground will not be required.

While several more or less specific embodiments of my invention have been shown, it is to be understood that this is for purpose of illustration only and that the invention is not to be limited thereby, but its scope is to be determined by the appended claims.

What I claim is:

1. A method of producing pyrolyzed organic bituminous products in fluid form as free-flowing oils and gases from a non-consolidated tar-sand in situ in the earth which tar-sand is relatively impermeable to such fluids but is vertically contiguous to a layer of different geological character permeable to flow of such fluid products, comprising pyrolyzing in situ the bituminous values in the non-consolidated substantially impermeable, tar-sand to form pyrolyzed free-flowing oils and gaseous products said pyrolysis being effected in said tar-sand formation adjacent to said geological layer, flowing said fluid products of pyrolysis laterally away from the site of said pyrolysis outside of the confines of said tar-sand and through said vertically contiguous geological formation and thereafter flowing said products to the surface.

2. A method as claimed in claim 1 in which said pyrolysis is carried out by heating said tar-sand formation, more heat being supplied adjacent the said vertically contiguous geological formation than elsewhere in the formation.

3. A method as claimed in claim 1 wherein gaseous pressure is applied to overcome the weight of the overburden and create laterally extending channels adjacent said permeable geological layer through which said fluid products may be flowed laterally from the zone of said pyrolysis.

4. A method as claimed in claim 1 wherein said pyrolysis is initiated by introducing a combustion-supporting gaseous fluid into said tar-sand in situ.

5. A method as claimed in claim 4 wherein the pressure of the combustion-supporting gaseous fluid is rapidly increased to effect spontaneous combustion in situ.

References Cited in the file of this patent

UNITED STATES PATENTS

| Number | Name | Date |
|---|---|---|
| 1,342,780 | Vedder | June 8, 1920 |
| 1,422,204 | Hoover et al. | July 11, 1922 |
| 1,457,479 | Wolcott | June 5, 1923 |
| 1,473,348 | Howard | Nov. 6, 1923 |
| 1,851,446 | Ranney | Mar. 29, 1932 |
| 2,584,605 | Merriam et al. | Feb. 5, 1952 |
| 2,593,477 | Newman et al. | Apr. 22, 1952 |
| 2,630,307 | Martin | Mar. 3, 1953 |
| 2,634,961 | Ljungstrom | Apr. 14, 1953 |

FOREIGN PATENTS

| Number | Country | Date |
|---|---|---|
| 200,423 | Germany | July 17, 1908 |
| 121,737 | Sweden | May 25, 1948 |
| 140,600 | Sweden | June 2, 1953 |